Figure 1:
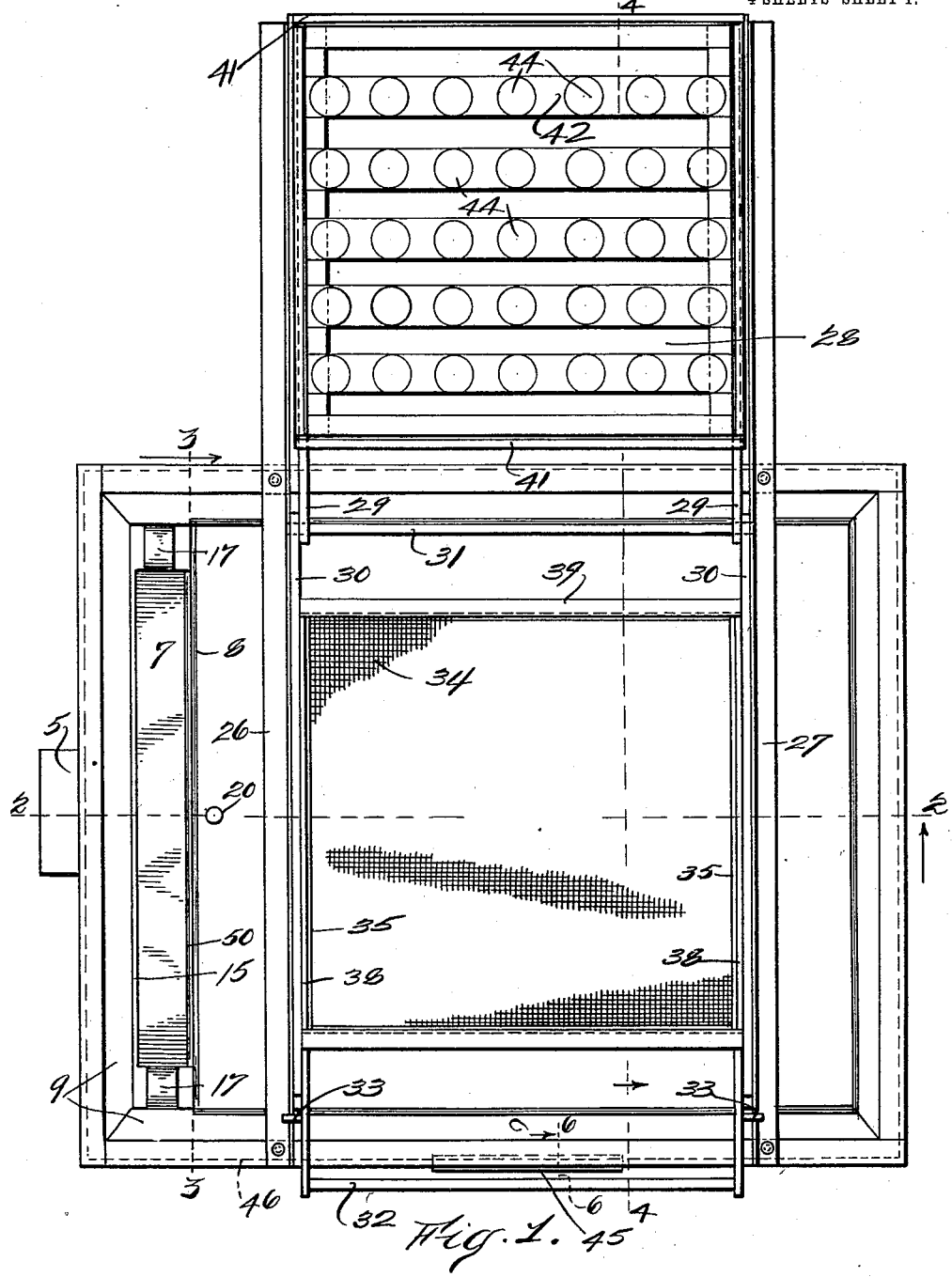

E. HERISSE.
DIPPING APPARATUS.
APPLICATION FILED JUNE 14, 1911.

1,008,034.

Patented Nov. 7, 1911.

4 SHEETS—SHEET 1.

Witnesses:
C. A. Jarvis
Estelle O. Hamburger

Inventor:
Emile Herisse
attorney.

E. HERISSE.
DIPPING APPARATUS.
APPLICATION FILED JUNE 14, 1911.
1,008,034.
Patented Nov. 7, 1911.
4 SHEETS—SHEET 2.
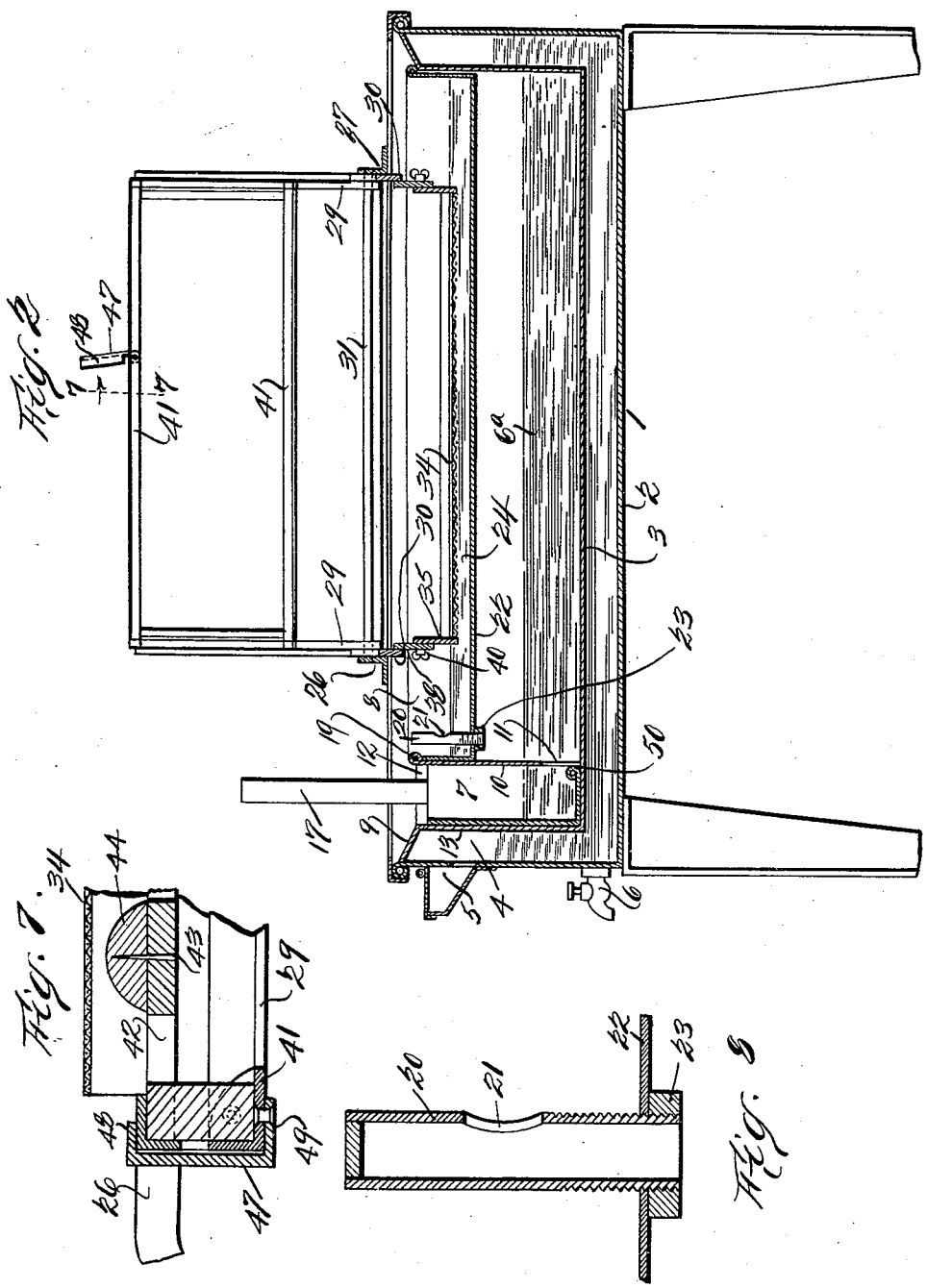
Witnesses:
C. A. Jarvis
Estelle O. Hamburger.
Inventor:
Emile Herisse
by Maurice Bloch
Attorney.

E. HERISSE.
DIPPING APPARATUS.
APPLICATION FILED JUNE 14, 1911.
1,008,034.
Patented Nov. 7, 1911.
4 SHEETS—SHEET 3.
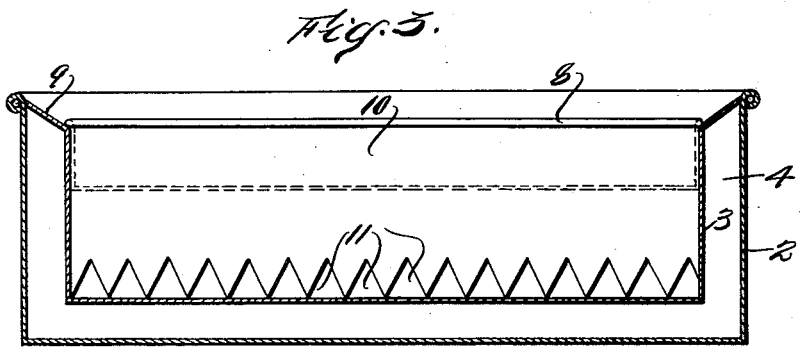
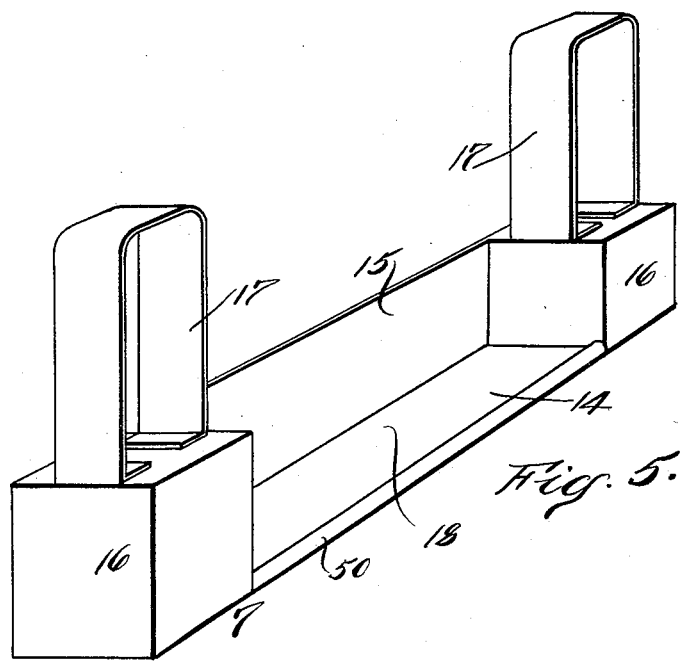
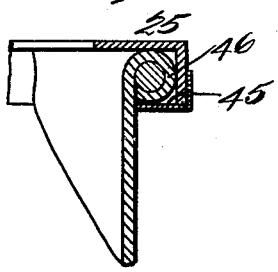
Witnesses:
C. A. Jarvis
Estelle O. Hamburger
Inventor:
Emile Herisse
attorney.

E. HERISSE.
DIPPING APPARATUS.
APPLICATION FILED JUNE 14, 1911.
1,008,034.
Patented Nov. 7, 1911.
4 SHEETS—SHEET 4.
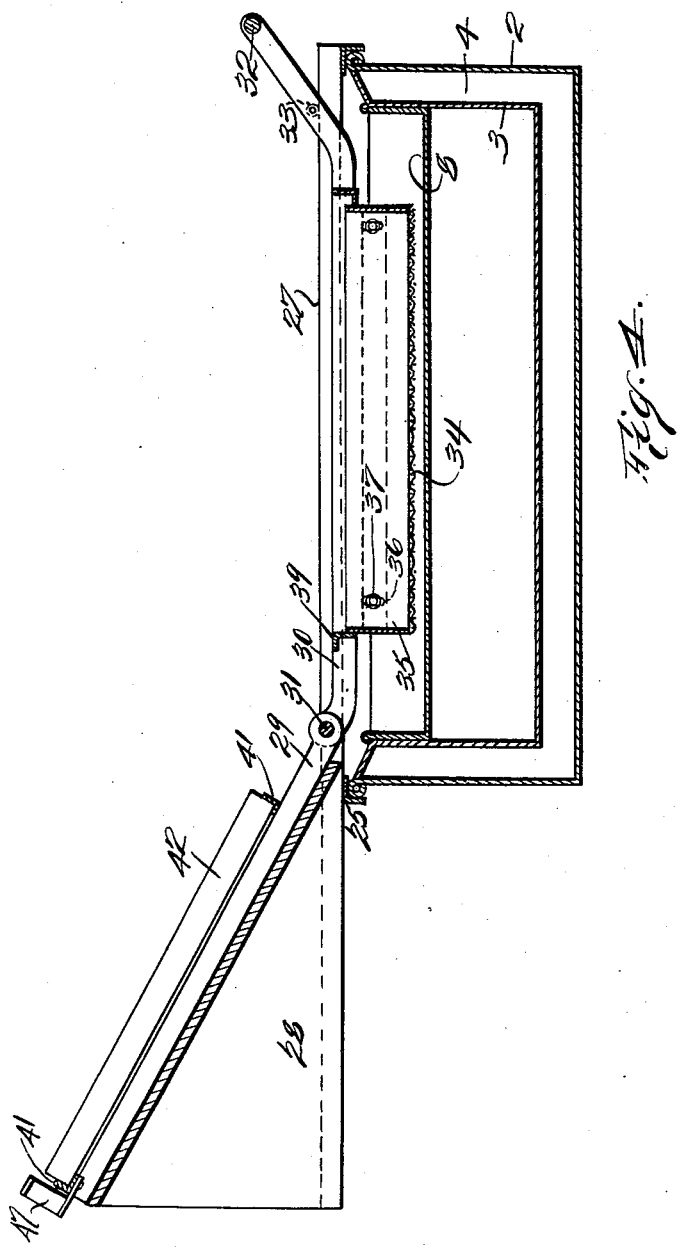

UNITED STATES PATENT OFFICE.

EMILE HERISSE, OF NEW YORK, N. Y.

DIPPING APPARATUS.

1,008,034. Specification of Letters Patent. Patented Nov. 7, 1911.

Application filed June 14, 1911. Serial No. 633,005.

*To all whom it may concern:*

Be it known that I, EMILE HERISSE, a citizen of the United States of America, residing at New York city, Manhattan borough, county and State of New York, have invented certain new and useful Improvements in Dipping Apparatus, of which the following is a full, clear, and exact description.

This invention relates to an improvement in dipping machines.

The class of dipping machines to which my invention relates are those used for the purpose of supporting cakes or the like while the said cakes are being dipped into chocolate or other similar substance.

One of the principal objects of my invention is to provide a dipping machine of the character above set forth, which is provided with a device for regulating the level of the material into which the cakes are dipped.

A further feature of my invention is to provide a device adapted to convey the coating material from a source of supply to the dipping pan.

Further features of improvement will hereinafter appear.

I will now proceed to describe my invention in detail, the novel features of which I will finally point out in the claims, reference being had to the accompanying drawings, which illustrate one embodiment of my invention, wherein:—

Figure 1 illustrates a plan view of my invention as herein embodied; Fig. 2 is a transverse section thereof, the section being taken on a line 2—2 in Fig. 1; Fig. 3 is a detail sectional view taken on a line 3—3 in Fig. 1; showing the serrated end of the dipping pan; Fig. 4 is a longitudinal sectional view, the section being taken on a line 4—4 in Fig. 1; Fig. 5 is an enlarged detail perspective view of the coating material elevating device; Fig. 6 is an enlarged fragmentary sectional detail view, the section being taken on a line 6—6 in Fig. 1, showing the manner of locking the supplemental tray and screen carrying frame to the body of the device; Fig. 7 is an enlarged fragmentary sectional view, the section being taken on a line 7—7 in Fig. 2; and Fig. 8 is an enlarged vertical sectional detail view showing the device for regulating the level of the coating material in the dipping pan.

Referring to the drawings, particularly to Fig. 2, my improved device as herein illustrated comprises a water jacketed pan 1 consisting of the outer casing 2 and inner pan 3, the space 4 between the said casing being kept filled, or partly filled, with water heated to the proper temperature, the water being introduced into the said space through a spout 5. The water can be drawn off through an outlet cock 6 when the said water cools too much. The heated water in the space 4 keeps the coating material, chocolate for instance, in the inner pan 3 at the proper consistency, the said coating material being indicated by 6ª. The inner pan 3 acts as a reservoir from which the coating material may be drawn, as required, by an elevating device 7 which deposits the supply in a dipping pan 8. The dipping pan 8 is removably supported by the inclined top 9 of the water jacketed pan or body portion 1 of the device. As will be seen, the inner pan or reservoir 3 is divided or partitioned by a depending wall 10 on the dipping pan 8, which wall is serrated as at 11, (see also Fig. 3). The small space 12 between the wall 10 and end 13 of the reservoir 3 serves as a well into which the elevating device 7 is placed. The elevating device or ladle 7 is fitted in the space 12 sufficiently close to preclude the coating material from getting in between the adjacent walls of the said elevating device and reservoir 3.

By referring to Fig. 5, it will be seen that the elevating device or ladle 7 consists of a bottom 14, a rear wall 15, and the cubical ends 16, which in turn carry handles 17, by which means the device is raised, whereby the coating material in the space 18 is carried upwardly and allowed to flow over the edge 19 of the dipping pan 8 and into said dipping pan. The ends 16 of the ladle, as herein illustrated, may be weighted or not, but they serve, whether weighted or not, to cause the ladle to sink into the material in the well 12, when said ladle is lowered after use. In other words, they add enough weight to the ladle to prevent it from floating on the coating material.

To maintain the supply of coating material at the proper level in the dipping pan, I provide a tubular plug 20 (see Figs. 2 and 8), having an opening 21. The plug 20 is screwed into the bottom 22 of the pan 8 as well as into a block 23 carried thereby. By rotating the plug 20, I am able to bring the opening 21 therein closer to or farther away from the said bottom 22, whereby the level of the material 24 in the pan 8 can be changed at will, and also maintained. The plug 20 puts the pan 8 and reservoir 3 in communication.

A further feature of my invention comprises a removable supplemental frame 25 (see Figs. 2 and 4), consisting of the members 26 and 27, which support an inclined table 28, a pivotal tray supporting frame 29, and a pivotal screen carrying frame 30, the said frames 29 and 30 being rotatably mounted at one end thereof, on a bar 31 extending from the frame members 26 and 27. The forward end of the screen carrying frame 30 is provided with a handle 32, which in turn is provided with pins 33 (see also Fig. 1) which act to limit the downward position of the frame 30 relative to the surface of the material 24 in the pan 8.

As can be seen in Fig. 4, the frame 30 supports a screen 34, the said screen being secured in any suitable manner to the bottom edge of a box-like structure 35, provided with slots 36, through which bolts 37 pass. The bolts 37 secure the box 35 to the downwardly extending plates 38 (see Fig. 2), which in turn are secured to the frame members 30, the said frame members being cross connected by separators 39. By means of the bolts 37, and wing nuts 40 (see Fig. 2), I am able to move the screen 34 and supporting structure 35 upwardly or downwardly, relatively to the material 24.

To the tray carrying frame members 29 are secured angle irons 41 (see Figs. 2 and 4) which serve to removably support a tray 42, which in turn is provided with a plurality of pins 43 (one only being shown in Fig. 7), upon which the cakes 44 (see Figs. 1 and 7) are impaled. The forward end of the frame 25 is provided with a lip 45 (see Fig. 6) which underlaps the edge 46 of the body portion 1. The lip 46 prevents the frame 25 from raising when the screen frame 30 is raised. The opposite end of the supplemental frame 25 is kept down by virtue of the weight thereof. To remove the frame 25 it is pushed forward to cause the lip 45 to clear the edge 46 of the body portion 1 and then lifted bodily. To apply the frame a reversal of the above-named operation is necessary.

The device operates as follows: When it is desirable to coat cakes the said cakes are placed upon the pins 43 on the tray 42, as shown in Fig. 7. The tray is then placed upon the tray frame 29 as shown in Fig. 4, the said frame being positioned as shown in said Fig. 4, in contact with the table 28. After having placed the tray on the frame therefor, the screen frame 30 is swung upwardly and over until it rests upon the frame 29, as shown in Fig. 7. When so positioned, the screen 34 will not contact with the cakes 44, but will be sufficiently close, however, to prevent the said cakes from being pulled away from the pins 43, while the said cakes are being dipped.

After the frame 30 has been moved to contact with the frame 29, the said two frames are locked together by means of a pivotal latch 47 (see Figs. 4 and 7). The latch 47 is pivotally mounted on the frame 29, as shown, and may be swung to cause the flanges 48 and 49 thereof to overlap the end members of the said frames 29 and 30, thereby locking said frames together. After the frames 29 and 30 have been locked together, they are simultaneously swung toward and into the dipping pan 8, that is to say, the screen 34 is swung into the pan to the position shown in Fig. 2. When the screen 34 has been swung to said position, it will be submerged in the material 24. The level of the material 24 will be such as to cause the tips of the cakes 44 to contact therewith, when the said two frames are swung as above set forth, thereby causing some of the material to adhere to the said cakes.

After having dipped a number of trays full of cakes, it will be necessary to supply more material to the pan 8, which is accomplished by raising the ladle 7 until the edge 50 thereof comes in line with the edge 19 of the pan 8, at which time the material in the ladle will flow out and into the pan 8, thereby restoring the level of the material therein.

Owing to the serrations 11 in the wall 10 of the pan 8, the ladle 7 will be filled to the level of the supply in the pan or body portion, 1. When the ladle is raised, and when the edge 50 thereof passes the serrations 11, the material in said ladle will be confined therein, due to the walled ends thereof, and imperforate portion of the said wall 10. The open side of the ladle 7 serves as a means to cause the ladle to fill, to the level of the material in the reservoir, when the bottom 18 thereof is submerged to cause the serrations 11 to communicate with the space 18 in the ladle, the imperforate portion of the wall 10 serving to close the open side of the said ladle, and to form a bucket, when said ladle is raised enough to cause the edge 50 thereof to clear the serrations or openings 11.

As the cakes which I preferably dip, by means of my improved device, are usually partly covered with marshmallow or the like, I prefer to adjustably mount the screen 34 in order that the said screen may be moved away from the said cakes, should the marshmallow thereon be thick or pointed, as the said screen must not touch the marshmallow, for the reason that it would stick thereto and prevent proper dipping. By means of the plug or level governing device 20, it is impossible to get too much material in the pan 8. Any material, that may drip after the frames 29 and 30 have been swung to cause the frames 29 to rest upon the table 28, in order that the said frames can be unlocked and a tray 42 removed from the frame 29, will flow down the inclined top of the table and into the pan 8.

Having now described my invention, what I claim and desire to secure by Letters Patent is:—

1. In a dipping machine, a pan adapted to retain a coating material, a source of supply adjacent thereto, said pan and said source of supply being normally in communication one with the other, an adjustable hollow plug carried by said pan adapted to place said pan and said source of supply in communication one with the other, said plug being provided with an opening in the wall thereof, adapted for the passage therethrough of some of the material in said pan to said source of supply, should the level of the material in said pan tend to exceed a predetermined limit, and means adapted to convey material from said supply to said pan.

2. In a dipping machine, a supply reservoir, a dipping pan located therein, said pan being shorter than said reservoir, but of substantially the same width, and means located in the space between said pan and the adjacent wall of said reservoir adapted to convey material from said reservoir to said pan.

3. In a dipping machine, a supply reservoir, a dipping pan located therein, said pan being shorter than said reservoir, but of substantially the same width, and a ladle located in the space between said pan and the adjacent wall of said reservoir adapted to convey material from said reservoir to said pan.

4. In a dipping machine, a supply reservoir, a dipping pan located therein, said pan being shorter than said reservoir, but of substantially the same width, and a ladle having an open side located in the space between said pan and the adjacent wall of said reservoir adapted to convey material from said reservoir to said pan.

5. In a dipping machine, a supply reservoir, a dipping pan located therein, said pan being shorter than said reservoir but of substantially the same width, and a vertically movable device located in the space between said pan and the adjacent wall of said reservoir adapted to convey material from said reservoir to said pan.

6. In a dipping machine, a supply reservoir, a pan in said reservoir, a well located between said pan and said reservoir, said well being in communication with said reservoir, and means normally located in said well adapted to convey material from said reservoir to said pan.

7. In a dipping machine, a supply reservoir, a dipping pan in said reservoir, said pan being shorter than said reservoir, a downwardly extending wall carried by said dipping pan contacting with the bottom of said supply reservoir, said wall being provided with openings adapted for the passage therethrough of the material in said reservoir to the space between said downwardly extending wall and the adjacent side of said reservoir, and means adapted to convey the material in said space to said dipping pan.

8. In a dipping machine, a supply reservoir, a dipping pan in said reservoir, said pan being shorter than said reservoir, a downwardly extending wall carried by said dipping pan contacting with the bottom of said supply reservoir, said wall being provided with openings adapted for the passage therethrough of the material in said reservoir to the space between said downwardly extending wall and the adjacent side of said reservoir, a ladle adapted to fit in the space between said wall and the adjacent wall of said reservoir, said ladle consisting of a bottom member, an upwardly extending rear member and two closed ends, the open side of said ladle being in communication with the openings in said wall.

9. In a dipping machine, a supply reservoir, a dipping pan located therein, a screen pivotally mounted above said dipping pan, a frame adapted to support a tray also pivotally mounted above said pan, said screen being adapted to be moved to cover the tray on the frame therefor, said screen and said tray frame being adapted to be moved in unison to cause said screen to pass into the material in said dipping frame, and means adapted to convey material from said reservoir to said dipping pan.

10. In a dipping machine, a supply reservoir, a dipping pan located therein, a screen pivotally mounted above said dipping pan, a frame adapted to support a tray also pivotally mounted above said pan, said screen being adapted to be moved to cover the tray on the frame therefor, said screen and said tray frame being adapted to be moved in unison to cause said screen to pass into the material in said dipping frame, means adapted to convey material from said reservoir to said dipping pan, and means adapted to control the level of the material in said dipping pan.

11. In a dipping machine, a pivotally mounted frame adapted to support a tray, a coöperative frame mounted adjacent thereto, a screen carried by the frame last named, said screen carrying frame and said tray carrying frame being adapted to be brought together, thereby causing said screen to cover the tray on said tray frame, means adapted to lock said frames together, and means adjacent said screen adapted to coat articles on said tray with the coating material.

12. In a dipping machine, a pivotally mounted frame, adapted to support a tray, a pivotally mounted frame adjacent thereto, a screen carried by the frame last-named, said screen being adjustably mounted on the frame therefor, said frames being adapted to be swung upon their pivot points and brought together, thereby causing said screen to cover said tray, means adapted to lock said frames together, said frames being adapted to be swung in unison on their pivot points after having been locked together, and a dipping pan adapted to retain a coating material located adjacent said frames.

Signed at New York city, N. Y. this 12th day of June, 1911.

EMILE HERISSE.

Witnesses:
 EDWARD A. JARVIS,
 ESTELLE O. HAMBURGER.

Copies of this patent may be obtained for five cents each, by addressing the "Commissioner of Patents, Washington. D. C."